United States Patent
Haneishi et al.

(10) Patent No.: US 7,044,276 B2
(45) Date of Patent: May 16, 2006

(54) DYNAMIC DAMPER AND PROPELLER SHAFT

(75) Inventors: Kazunobu Haneishi, Tochigi (JP); Katsuhide Sasaki, Tochigi (JP)

(73) Assignee: Showa Corporation (JP)

( * ) Notice: Subject to any disclaimer, the term of this patent is extended or adjusted under 35 U.S.C. 154(b) by 377 days.

(21) Appl. No.: 10/238,210

(22) Filed: Sep. 10, 2002

(65) Prior Publication Data

US 2003/0159899 A1 Aug. 28, 2003

(30) Foreign Application Priority Data

Feb. 22, 2002 (JP) .................................... 2002-047002

(51) Int. Cl.
*F16F 7/10* (2006.01)

(52) U.S. Cl. ........................... 188/379; 464/180
(58) Field of Classification Search ............... 188/379, 188/378; 267/140.12; 464/180, 183
See application file for complete search history.

(56) References Cited

U.S. PATENT DOCUMENTS

| | | | |
|---|---|---|---|
| 3,075,406 A | * | 1/1963 | Butler, Jr. et al. ............ 74/574 |
| 4,207,957 A | * | 6/1980 | Sivers et al. ................. 180/380 |
| 4,223,565 A | * | 9/1980 | Sugiyama et al. ............ 74/574 |
| 4,392,681 A | * | 7/1983 | Raquet ............................ 295/7 |
| 5,188,002 A | * | 2/1993 | Wolf et al. ...................... 74/574 |
| 5,326,324 A | * | 7/1994 | Hamada ...................... 464/180 |
| 5,328,408 A | * | 7/1994 | Wolf et al. ................... 464/180 |
| 5,352,157 A | * | 10/1994 | Ochs et al. .................... 464/89 |
| 5,460,574 A | * | 10/1995 | Hobaugh ..................... 464/162 |
| 5,503,043 A | * | 4/1996 | Olbrich ......................... 74/574 |
| 6,312,340 B1 | * | 11/2001 | Gassen et al. ............. 464/180 |
| 6,536,566 B1 | * | 3/2003 | Hasegawa et al. .......... 188/378 |
| 6,560,837 B1 | * | 5/2003 | Hodjat et al. ................. 29/280 |
| 2002/0193168 A1 | * | 12/2002 | Hosooka et al. ............ 464/180 |
| 2003/0040370 A1 | * | 2/2003 | Gartner et al. ............. 464/180 |

FOREIGN PATENT DOCUMENTS

| | | | |
|---|---|---|---|
| DE | 3535286 | * | 4/1987 |
| DE | 3940365 | | 10/1991 |
| DE | 19733478 | | 4/1999 |
| JP | 08290722 | | 5/1996 |
| JP | 8290722 | * | 11/1996 |
| JP | 09011762 | | 1/1997 |
| JP | 09164854 | | 6/1997 |
| JP | 2001260681 | * | 9/2001 |
| JP | 2002168291 | * | 6/2002 |
| WO | WO 99/06730 | * | 2/1999 |

OTHER PUBLICATIONS

Japanese Utility Model Application Publication No. HEI 7–29324.

* cited by examiner

*Primary Examiner*—Robert A. Siconolfi
*Assistant Examiner*—Devon Kramer
(74) *Attorney, Agent, or Firm*—Orum & Roth

(57) ABSTRACT

This invention provides a dynamic damper comprising an outer pipe 20, a weight 30 and an elastic body 40, wherein convex portions 21 protruded in the direction of the inside diameter are provided at plural positions along the circumferential direction of the outer pipe so as to hold the elastic body 40 by sandwiching the outer circumferential portion of the elastic body 40 between adjacent the convex portions.

18 Claims, 2 Drawing Sheets

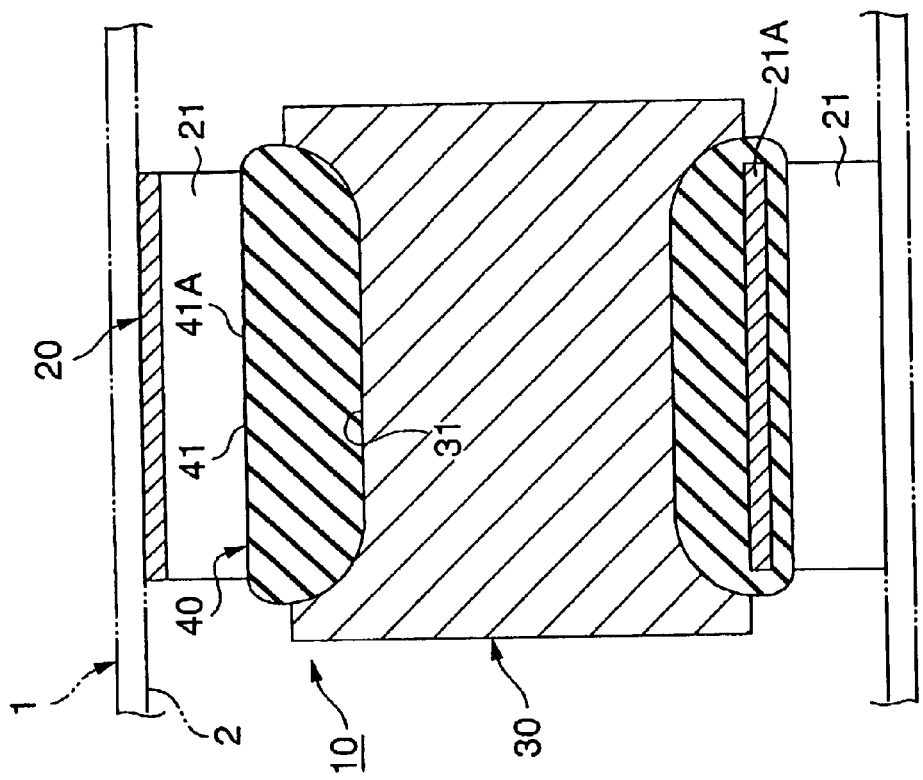
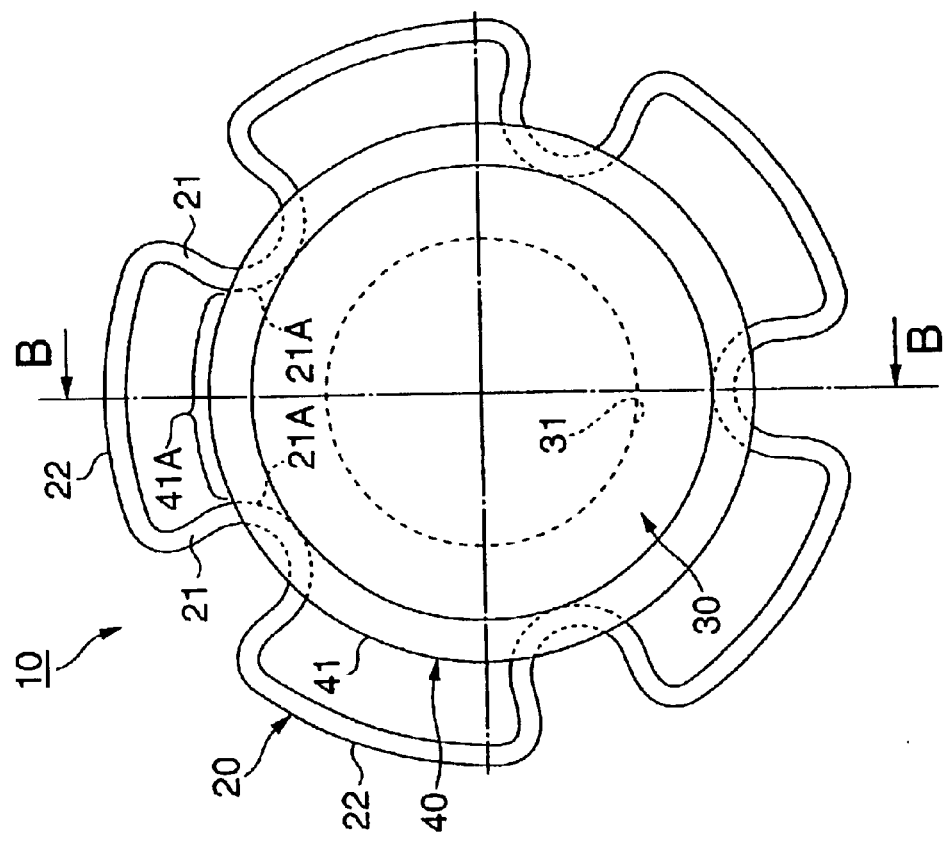

DYNAMIC DAMPER AND PROPELLER SHAFT

BACKGROUND OF THE INVENTION

1. Field of the Invention

The present invention relates to a dynamic damper and a propeller shaft.

2. Description of the Related Art

There are dampers, which reduce vibration of an automobile driving power transmitting member, such as a propeller shaft, in order to reduce vehicle vibration and mechanical noise. Such dynamic dampers include an outer pipe, a weight disposed inside the outer pipe and an elastic body disposed between the outer pipe and the weight. This dynamic damper is pressed into a hollow shaft constituting the propeller shaft and is fixed thereto. In the dynamic damper disclosed in Japanese Utility Model Application Publication No. H7-29324, an elastic body is disposed in an annular space between an outer pipe and a weight, and a rod-like elastic interposed portion is provided so as to extend in the radius direction at each of plural positions (five positions) in the circumferential direction of the annular space.

Conventional technology has the following problems.

(1) The elastic body is so supported that an end of each elastic interposed portion is abutted to an inner face of the outer pipe while the other end portion thereof is abutted to an outer face of the weight. Thus, the elastic body receives repeated compression in the radius direction and shearing stress in the rotation direction resulting from vibration of the propeller shaft. Cracks are generated thereby deteriorating the durability of the dynamic damper.

(2) The dynamic damper must be pressed into and fixed to a hollow shaft firmly so as not to be deflected by acceleration/deceleration and vibration accompanied by a rotation of the propeller shaft. In case of a type in which the entire circumference of the outer pipe is pressed into the hollow shaft directly, both the members cannot be fit to each other easily due to existence of dimensional error between the inside diameter of the hollow shaft and the outside diameter of the outer pipe. Thus, a high dimensional accuracy is needed. Further, because the outer pipe is pressed into the hollow shaft with the entire circumference sliding on the inner face of the same hollow shaft, a contact area of the outer pipe relative to the inner face of the hollow shaft is increased. Therefore, a large press in operation force is required, which leads to the increase of production cost.

SUMMARY OF THE INVENTION

An object of the present invention is to provide a dynamic damper having improved durability and reliability.

Another object of the present invention is to press a dynamic damper into a hollow shaft easily, to be fixed thereto stably.

According to the present invention, there is disclosed a dynamic damper comprising an outer pipe, a weight disposed inside the outer pipe and an elastic body interposed between the outer pipe and the weight.

Convex portions protruded in the direction of the inside diameter are provided at a plurality of positions along the circumferential direction of the outer pipe so as to hold the elastic body by sandwiching the outer circumferential portion of the elastic body between the adjacent convex portions.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

FIGS. 1A and 1B show a dynamic damper, while FIG. 1A is a front view thereof and FIG. 1B is a sectional view taken along the line B—B.

DESCRIPTION OF THE PREFERRED EMBODIMENTS

Figure 2:
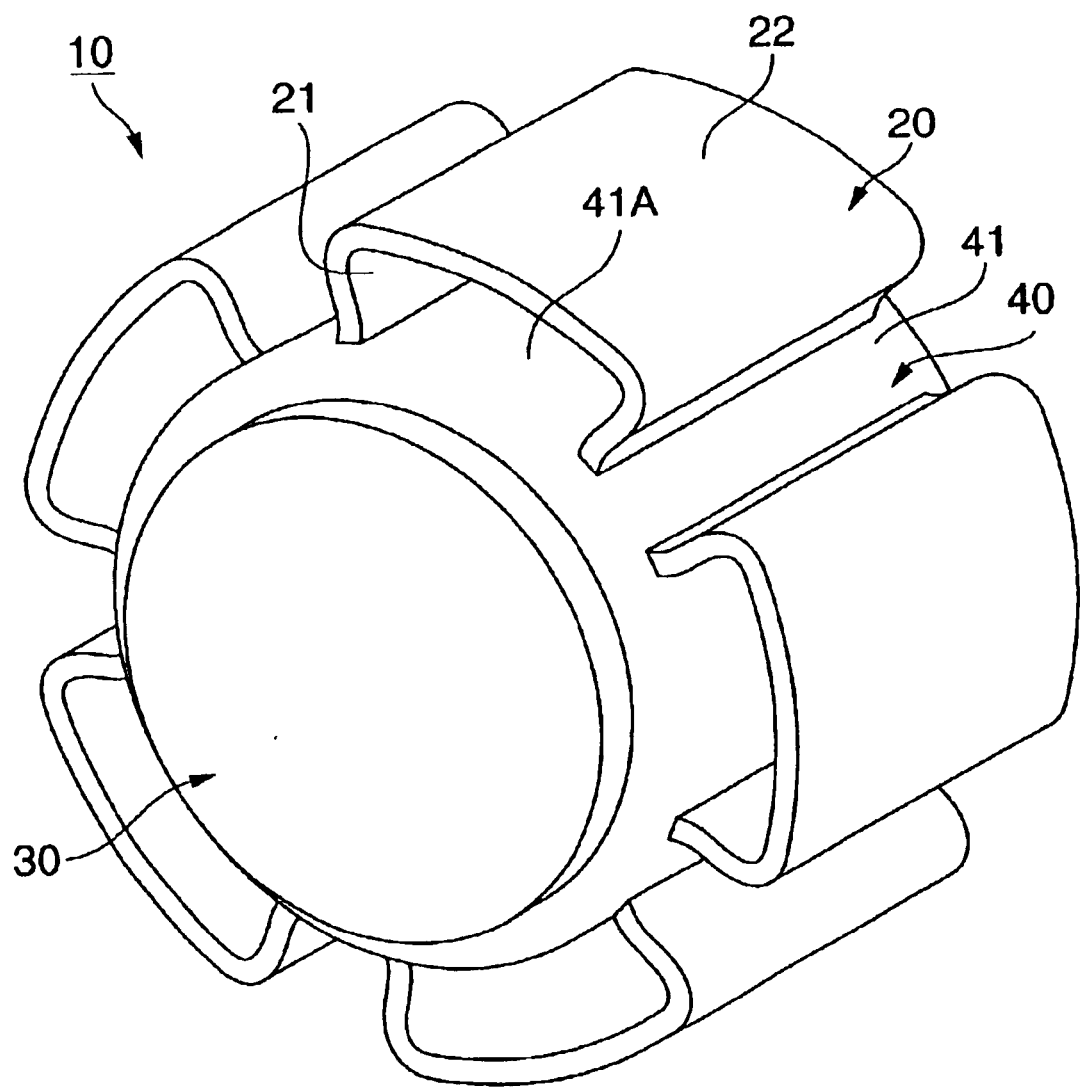
FIG. 2 shows a perspective view showing a dynamic damper.

Reference numeral 10 in FIGS. 1A and 1B denotes a dynamic damper 10, which is pressed into a hollow shaft 2 of an automobile propeller shaft 1 and disposed at a predetermined position thereof in the axial direction. The dynamic damper 10 reduces vibration of the propeller shaft 1 so as to reduce vehicle body vibration and mechanical noise.

The dynamic damper 10 comprises an outer pipe 20, a weight 30 and an elastic body 40.

The outer pipe 20 is formed by bending a metallic pipe such as thin steel pipe in the form of an irregularly shaped cylinder. This outer pipe 20 contains convex portions 21 protruded in the direction of its inside diameter at a plurality of positions (5 positions in this specification) along the circumferential direction. More specifically, in the outer pipe 20, the convex portions 21 are formed by bending the plural portions along the circumferential direction of a round pipe in the direction of the inside direction with a press while remaining portions are kept as circular portions 22 (circular portion 22 having substantially the same curvature of a hollow shaft 2). An end face of the convex portion 21 of the outer pipe 20 acts as a round pressing face 21A to the outer circumferential portion of an elastic body 40. The outside diameter of the outer pipe 20 under the free state formed by the circular portions 22 is set larger than the inside diameter of the hollow shaft 2. The outside diameter can be contracted elastically from the free state due to the elastic distortion characteristic possessed by the bent portion of the convex portion 21.

The weight 30 is formed of a metallic rod such as steel rod in the form of a short cylinder, such as a circular cylinder. The weight 30 has annular grooves 31 provided in the entire circumference for loading the elastic body 40. The weight 30 is disposed inside the outer pipe 20 coaxially with the outer pipe 20. The weight 30 is wider than the outer pipe 20 (FIG. 1B).

The elastic body 40 is formed in an annular form and is loaded on the entire circumference of the annular groove 31 in the weight 30 between the outer pipe 20 and the weight 30. The outer circumference of the elastic body 40 is a circular face continuous along the entire circumference, which is larger than the outside diameter of the weight 30. The elastic body 40 is formed of synthetic rubber and is bonded to the outer pipe 20 and the weight 30 by vulcanizing.

The dynamic damper 10 holds the elastic body 40 by sandwiching the elastic body 40 on the weight 30 with the end pressing faces 21A of the convex portion 21 of the outer pipe 20 from the radiation direction. Also, the dynamic damper 10 sandwiches the outer peripheral portion 41 of the elastic body 40 between the end pressing faces 21A in the circumferential direction, of the convex portions 21 adjacent in the circumferential direction of the outer pipe 20. The end pressing face 21A of each convex portion 21 is buried in a predetermined depth in the outer peripheral portion 41 of the elastic body 40. The outer peripheral portion 41A is sandwiched between the end pressing faces 21A of the convex portion 21.

To produce the dynamic damper 10, the elastic body 40 is formed integrally by pouring rubber into a mold in which the outer pipe 20 and the weight 30 are disposed. Alternatively, the elastic body 40 may be formed separately and subsequently be bonded to the outer pipe 20 and/or the weight 30.

The present embodiment has the following operations.

(1) In the dynamic damper 10, the annular elastic body 40 is provided along the entire annular space between the outer pipe 20 and the weight 30. The outer peripheral portion 41A of the elastic body 40 is sandwiched and held between the convex portion 21 and the convex portion 21 protruded in the direction of the inside diameter of the outer pipe 20 along the circumferential direction of the outer pipe 20. Consequently, repeated application of load due to compression in the radius direction from the weight 30, shearing stress in the rotation direction and the like based on rotary vibration of the propeller shaft 1 is distributed widely to respective portions of the elastic body 40. Therefore, stress concentration on the elastic body 40 is suppressed and damage due to cracks is prevented. As a result, the durability of the dynamic damper 10 is improved.

(2) The dynamic damper 10 is produced easily only by disposing the weight 30 inside the outer pipe 20 and forming the elastic body 40 between the both by injection molding.

(3) The convex portions 21 of the outer pipe 20 sandwich and hold the elastic body 40 through the round pressing faces 21A. Therefore, the distribution of the load (1) applied to the elastic body 40 based on vibration of the propeller shaft 1 is improved.

(4) The convex portions 21 are formed by bending respective portions of the outer pipe 20 along the circumferential direction in the direction of the inside diameter. Therefore, elastic distortion characteristics in the radius direction can be obtained in the bent portion of each convex portion 21. When the dynamic damper 10 is pressed into the hollow shaft 2, dimensional error between the inside diameter of the hollow shaft 2 and the outside diameter of the outer pipe 20 is absorbed by elastic distortion of the outer pipe 20 and elastic distortion of the elastic body 40. Thus, the dynamic damper 10 can be pressed into the hollow shaft easily. After pressing in, the dynamic damper 10 can be fixed firmly to the inner face of the hollow shaft 2 by elastic restoration forces of the outer pipe 20 and the elastic body 40.

(5) Only the plural circular portions 22 except the bent portions of the convex portions 21 on the entire circumference of the outer pipe 20 are pressed into the hollow shaft 2 with friction. As a result, the contact area of the outer pipe 20 to the inner face of the hollow shaft 2 is decreased, thereby decreasing the necessary press in operation force, so as to lead to a reduction of cost of production equipment.

(6) The convex portions 21 can be formed easily by bending the outer pipe 20 with a press or the like. The round pressing face 21A of the convex portion 21 mentioned the above (3) can be formed easily.

(7) The aforementioned (1) to (6) are achieved in the propeller shaft 1, thereby improving the durability of the dynamic damper 10. Further, the dynamic damper 10 can be pressed into the hollow shaft 2 and fixed thereto easily.

As heretofore explained, embodiments of the present invention have been described in detail with reference to the drawings. However, the specific configurations of the present invention are not limited to the embodiments but those having a modification of the design within the range of the present invention are also included in the present invention. For example, the dynamic damper of the present invention may be applied to a driving power transmitting member other than the propeller shaft.

As described above, according to the present invention, the durability and reliability of the dynamic damper can be improved. Further, according to the present invention, the dynamic damper can be pressed into the hollow shaft easily and fixed thereto in a stable condition.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A dynamic damper comprising an outer pipe, having a plurality of convex portions protruded in the direction of an inside diameter of the outer pipe, a weight disposed inside the outer pipe, said weight having an annular groove and an annular elastic body located in the annular groove and interposed between and bonded to the outer pipe and the weight, said elastic body having a circular inner face and a circular outer face, said outer face is continuous along the entire circumference wherein the convex portions are provided at a plurality of positions along the circumferential direction of the outer pipe so as to hold the elastic body by sandwiching an outer circumferential portion of the elastic body between adjacent convex portions.

2. The dynamic damper according to claim 1 wherein a contact face of the convex portion with an outer peripheral portion of the elastic body is formed in the form of a round face.

3. The dynamic damper according to claim 1 wherein the weight is disposed inside the outer pipe and coaxially with the outer pipe.

4. The dynamic damper according to claim 1 wherein the outer pipe is bent in the direction of an inside diameter at a plurality of positions along the circumferential direction so as to form the convex portions.

5. The dynamic damper according to claim 2 wherein the outer pipe is bent in the direction of an inside diameter at a plurality of positions along the circumferential direction so as to form the convex portions.

6. The dynamic damper according to claim 3 wherein the outer pipe is bent in the direction of an inside diameter at a plurality of positions along the circumferential direction so as to form the convex portions.

7. A propeller shaft wherein the outer pipe of they dynamic damper according to claim 1 is pressed into and fixed to a hollow shaft.

8. A propeller shaft wherein the outer pipe of the dynamic damper according to claim 2 is pressed into and fixed to a hollow shaft.

9. A propeller shaft wherein the outer pipe of the dynamic damper according to claim 3 is pressed into and fixed to a hollow shaft.

10. A propeller shaft wherein the outer pipe of the dynamic damper according to claim 4 is pressed into and fixed to a hollow shaft.

11. A propeller shaft wherein the outer pipe of the dynamic damper according to claim 5 is pressed into and fixed to a hollow shaft.

12. A propeller shaft wherein the outer pipe of the dynamic damper according to claim 6 is pressed into and fixed to a hollow shaft.

13. The dynamic damper according to claim 1 wherein the weight is a single weight.

14. The dynamic damper according to claim 2 wherein the weight is a single weight.

15. The dynamic damper according to claim 3 wherein the weight is a single weight.

16. The dynamic damper according to claim 4 wherein the weight is a single weight.

17. The dynamic damper according to claim 5 wherein the weight is a single weight.

18. The dynamic damper according to claim 6 wherein the weight is a single weight.

* * * * *